US008903631B2

United States Patent
Klingbeil et al.

(10) Patent No.: US 8,903,631 B2
(45) Date of Patent: *Dec. 2, 2014

(54) METHODS AND SYSTEMS FOR EXHAUST GAS RECIRCULATION COOLER REGENERATION

(75) Inventors: Adam Klingbeil, Niskayuna, NY (US); Roy Primus, Niskayuna, NY (US); Michael Easter, Lawrence Park, PA (US); Eric David Peters, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 710 days.

This patent is subject to a terminal disclaimer.

(21) Appl. No.: 13/163,391

(22) Filed: Jun. 17, 2011

(65) Prior Publication Data

US 2012/0323470 A1 Dec. 20, 2012

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| F02M 25/07 | (2006.01) |
| F02D 41/06 | (2006.01) |
| F02D 41/00 | (2006.01) |
| F02D 41/40 | (2006.01) |
| F02D 41/08 | (2006.01) |
| F02D 13/02 | (2006.01) |

(52) U.S. Cl.
CPC ............. *F02D 41/065* (2013.01); *F02D 41/08* (2013.01); *F02M 25/0731* (2013.01); *F02M 25/0749* (2013.01); *Y02T 10/44* (2013.01); *Y02T 10/47* (2013.01); *F02M 25/0701* (2013.01); *F02D 41/008* (2013.01); *F02D 41/405* (2013.01); *F02D 13/0219* (2013.01); *F02M 25/0754* (2013.01); *F02D 41/0087* (2013.01); *F02D 41/0055* (2013.01); *F02M 25/0738* (2013.01); *F02M 25/0707* (2013.01)

USPC ........ 701/108; 701/103; 123/568.12; 123/676

(58) Field of Classification Search
CPC ..... F02D 21/04; F02D 21/08; F02D 41/0035; F02D 41/0025; F02D 41/0235; F02D 41/024; F02D 41/0245; F02D 41/027; F02M 25/0749
USPC ........ 701/103, 104, 108; 123/568.11, 568.12, 123/672, 676; 60/295
See application file for complete search history.

(56) References Cited

U.S. PATENT DOCUMENTS

| | | |
|---|---|---|
| 6,425,381 B1 | 7/2002 | Rammer |
| 6,543,230 B1 | 4/2003 | Schmid |

(Continued)

FOREIGN PATENT DOCUMENTS

| | | |
|---|---|---|
| DE | 19838725 A1 | 3/2000 |
| FR | 2880069 A1 | 6/2006 |
| WO | 0111217 A1 | 2/2001 |

OTHER PUBLICATIONS

Search Report and Written Opinion from corresponding PCT Application No. PCT/US2012/039913 dated Oct. 30, 2013.

*Primary Examiner* — Erick Solis
*Assistant Examiner* — Anthony L Bacon
(74) *Attorney, Agent, or Firm* — GE Global Patent Operation; John A. Kramer

(57) ABSTRACT

Various methods and systems are provided for regenerating an exhaust gas recirculation cooler. One example method includes, routing exhaust gas from a donor cylinder group of an engine to an intake passage of the engine through the exhaust gas recirculation cooler, routing exhaust gas from a non-donor cylinder group of the engine to an exhaust passage of the engine, and adjusting fuel distribution among the donor cylinder group and the non-donor cylinder group responsive to a temperature of the exhaust gas recirculation cooler.

21 Claims, 7 Drawing Sheets

(56) References Cited

U.S. PATENT DOCUMENTS

| | | |
|---|---|---|
| 6,694,946 B1 | 2/2004 | Gaskins |
| 6,789,531 B1 | 9/2004 | Remmels |
| 6,826,903 B2 * | 12/2004 | Yahata et al. .................. 60/278 |
| 6,904,898 B1 * | 6/2005 | Sahlen ..................... 123/568.12 |
| 6,907,725 B2 | 6/2005 | Szymkowicz |
| 7,503,167 B2 | 3/2009 | Jankovic |
| 7,740,007 B2 * | 6/2010 | Grandas ................. 123/568.12 |
| 2008/0060624 A1 * | 3/2008 | Grandas ................. 123/568.12 |
| 2010/0051001 A1 * | 3/2010 | Webb et al. ............. 123/568.12 |
| 2011/0253113 A1 * | 10/2011 | Roth et al. ............... 123/568.12 |
| 2012/0323465 A1 * | 12/2012 | Peters et al. .................. 701/104 |

* cited by examiner

METHODS AND SYSTEMS FOR EXHAUST GAS RECIRCULATION COOLER REGENERATION

FIELD

Embodiments of the subject matter disclosed herein relate to regenerating an exhaust gas recirculation cooler in an exhaust gas recirculation system coupled to an internal combustion engine.

BACKGROUND

Engines may utilize recirculation of exhaust gas from an engine exhaust system to an engine intake system, a process referred to as exhaust gas recirculation (EGR), to reduce regulated emissions. In some examples, a group of one or more cylinders may have an exhaust manifold that is exclusively coupled to an intake passage of the engine such that the group of cylinders is dedicated, at least under some conditions, to generating exhaust gas for EGR. Such cylinders may be referred to as "donor cylinders." Further, some EGR systems may include an EGR cooler to reduce a temperature of the recirculated exhaust gas before it enters the intake passage. In such an example, fouling of the EGR cooler may occur when particulate matter (e.g., soot, hydrocarbons, oil, fuel, rust, ash, mineral deposits, and the like) in the exhaust gas accumulates within the EGR cooler, thereby decreasing effectiveness of the EGR cooler and increasing a pressure drop across the EGR cooler as well as temperature of the gas exiting the cooler, resulting in increased emissions and decreased fuel efficiency.

BRIEF DESCRIPTION

In one embodiment, an example method for regenerating an EGR cooler includes routing exhaust gas from a donor cylinder group of an engine to an intake passage of the engine through the EGR cooler, and routing exhaust gas from a non-donor cylinder group of the engine to an exhaust passage of the engine. The method further includes, adjusting fuel distribution among the donor cylinder group and the non-donor cylinder group responsive to a temperature of the EGR cooler.

In such an embodiment, the temperature of the EGR cooler may be controlled based on the fuel distribution among the donor cylinder group and the non-donor cylinder group. For example, when a fuel injection quantity to the donor cylinder group is decreased, an exhaust gas temperature of the donor cylinder group may correspondingly decrease, thereby decreasing a temperature of EGR flow and thus the EGR cooler. In this manner, the EGR cooler may be regenerated, as particulate build-up in the EGR cooler hydrolyzes due to the low temperature such that it may break off in the exhaust flow. Further, when a fuel injection quantity to the donor cylinder group increases, the exhaust gas temperature of the donor cylinder group may correspondingly increase, thereby increasing a temperature of EGR flow and thus the EGR cooler. In this way, the EGR cooler may be regenerated, as particulate build-up in the EGR cooler may be removed by the high temperature exhaust flow. Thus, the EGR cooler may be regenerated under high and/or low exhaust temperature conditions such that the effectiveness of the EGR cooler may increased or maintained.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
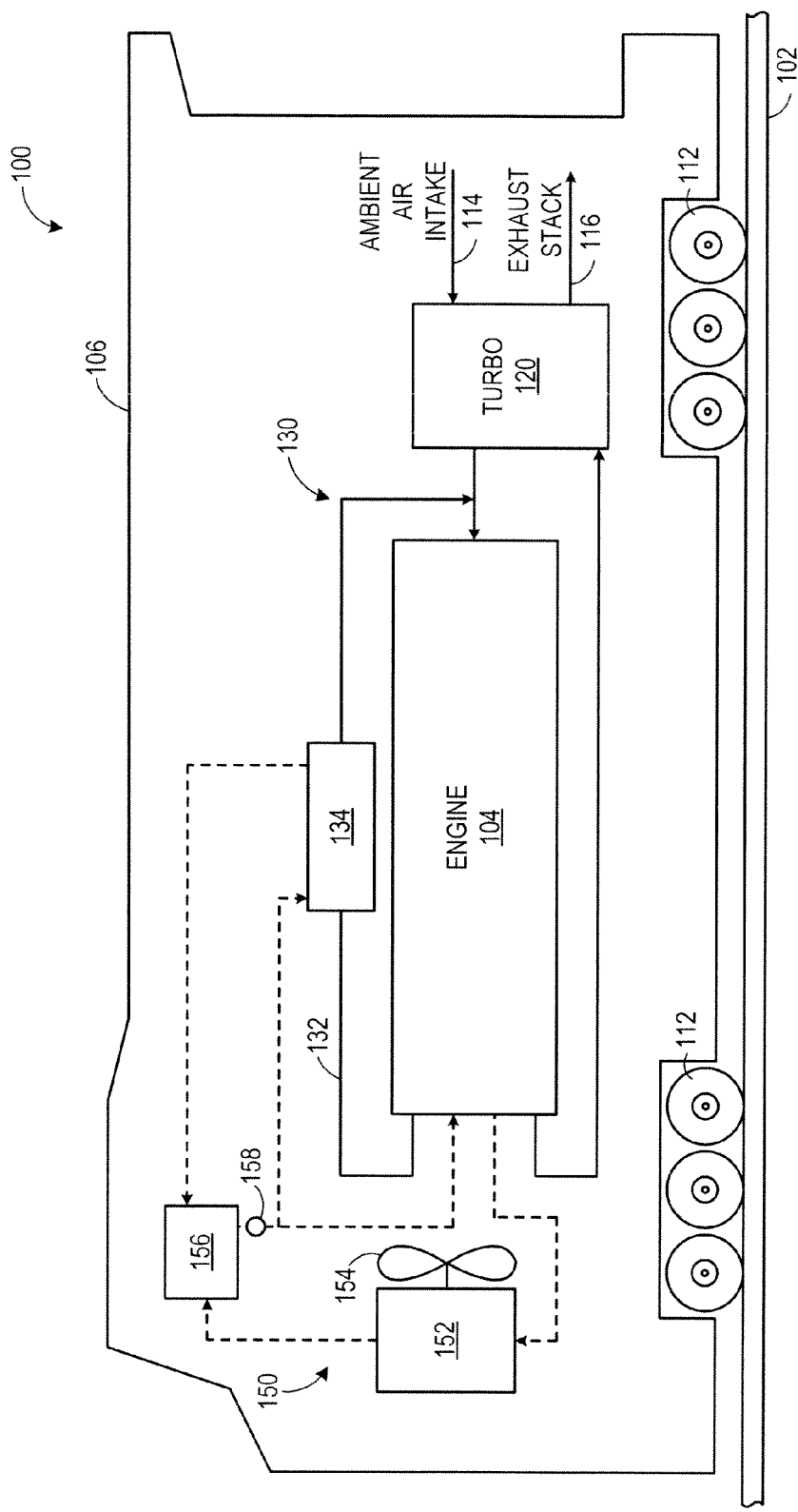
FIG. 1 shows a schematic diagram of an example embodiment of a rail vehicle with an engine according to an embodiment of the invention.

The following description relates to various embodiments of methods and systems for regenerating an exhaust gas recirculation (EGR) cooler. The EGR cooler may be part of an EGR system coupled to an engine in a vehicle, for example. One example method includes, routing exhaust gas from a donor cylinder group of the engine to an intake passage of the engine through the EGR cooler, routing exhaust gas from a non-donor cylinder group of the engine to an exhaust passage of the engine, and adjusting fuel distribution among the donor cylinder group and the non-donor cylinder group responsive to a temperature of the exhaust gas recirculation cooler. As used herein, donor cylinders refer to cylinders in which their exhaust is routed exclusively to the intake manifold, at least under some configurations, while non-donor cylinders refer to cylinders in which their exhaust is routed, eventually, to atmosphere. It should be appreciated that, as described herein, exhaust from donor cylinders may pass through various devices, such as an EGR cooler, before reaching the intake manifold. Likewise, exhaust from non-donor cylinders may pass through various emission control devices before reaching atmosphere.

In one example, the EGR system may be operated in a low temperature mode. In such an example, a fuel injection quantity to each donor cylinder may be reduced or completely cut-off while a fuel injection quantity to one or more of the non-donor cylinders is preferentially increased. In this manner, the donor cylinders may operate as an air pump to flow more intake air through the EGR cooler in order to reduce a temperature of the cooler such that particulate build-up may break off, thereby cleaning the EGR cooler. In another example, the EGR system may be operated in a high temperature mode. In such an example, the fuel injection quantity to each donor cylinder may be increased while preferentially reducing the fuel injection quantity to one or more of the non-donor cylinders. In this way, the donor cylinders may provide hot exhaust gas to the EGR cooler in order to remove particulates that may have accumulated within the EGR cooler such that the EGR cooler may be regenerated. As will be described in greater detail below, the adjusted fuel distribution among the donor cylinder and/or among the non-donor cylinder may be an even distribution or an uneven distribution. For example, while operating the donor cylinders with a greater average quantity of fuel per combustion cycle per cylinder than the non-donor cylinders, approximately the same quantity of fuel may be provided to each of the donor cylinders, or a different quantity of fuel may be provided to each of the donor cylinders. Likewise, approximately the same quantity of fuel may be provided to each of the non-donor cylinders, or a different quantity of fuel may be provided to each of the non-donor cylinders the donor cylinders.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Before further discussion of the cooler regeneration approach, an example of a platform is disclosed in which the EGR system may be configured for an engine in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The vehicle system 100 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system coupled in the exhaust passage upstream and/or downstream of the turbocharger 120. In one example embodiment, the aftertreatment system may include a diesel oxidation catalyst (DOC) and a diesel particulate filter (DPF). In other embodiments, the aftertreatment system may additionally or alternatively one or more emission control devices. Such emission control devices may include a selective catalytic reduction (SCR) catalyst, three-way catalyst, $NO_x$ trap, or various other devices or systems.

The vehicle system 100 further includes an exhaust gas recirculation (EGR) system 130 coupled to the engine 104, which routes exhaust gas from an exhaust manifold of the engine 104 to the intake passage 114 downstream of the turbocharger 120. In some embodiments, exhaust gas recirculation system 130 may be coupled exclusively to a group of one or more donor cylinders of the engine. As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 148, or it may control a variable amount of EGR, for example. In this manner, donor cylinders may be operated as non-donor cylinders, as desired. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller.

Coolant which is cooled by the radiator 152 enters a tank 156. The coolant may then be pumped by a water pump (not shown) back to the engine 104 or to another component of the vehicle system. As shown in FIG. 1, coolant may be pumped from the tank 156 to the EGR cooler 134 such that a temperature of exhaust gas flowing through the EGR cooler 134 may be reduced before it enters the intake passage 114. A temperature of the coolant may be measured by a coolant temperature sensor 158 before it enters the engine 104 or the EGR cooler 134. Coolant that passes through the EGR cooler 134 then flows back to the tank 156. In other embodiments, the EGR cooler and the radiator may have separate tanks.

In one example, a controller may be configured identify a temperature of coolant entering the EGR cooler, a temperature of coolant exiting the EGR cooler, a temperature of exhaust gas entering the EGR cooler, and a temperature of exhaust gas exiting the EGR cooler. The controller may utilize three of the four temperature measurements to calculate an effectivity of the EGR cooler, for example, as described in further detail with regard to FIG. 4.

Figure 2:
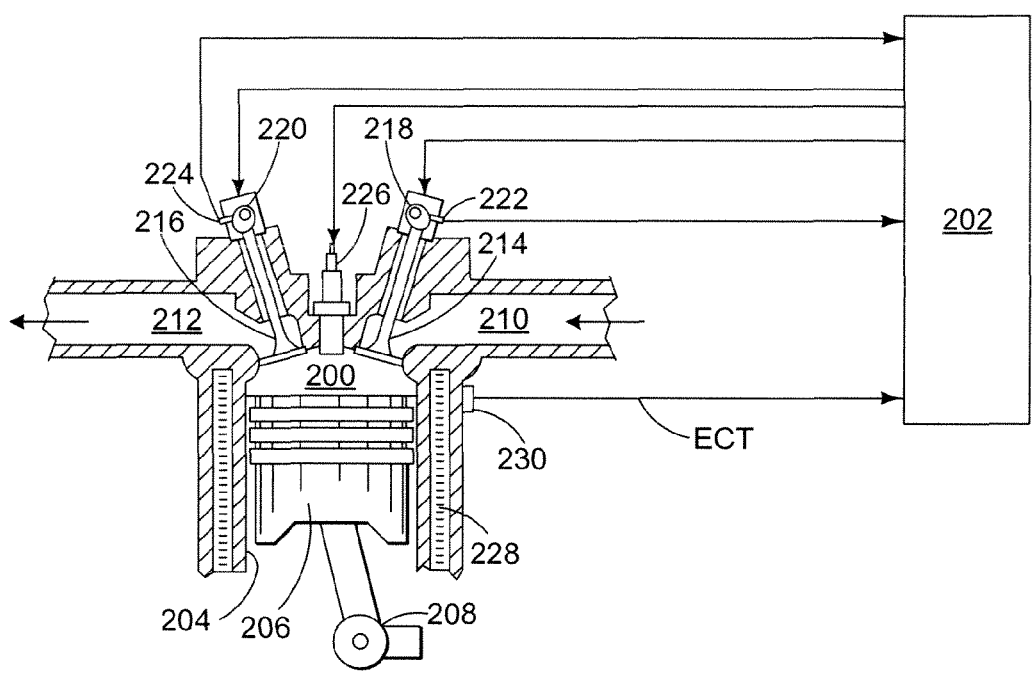
FIG. 2 shows a schematic diagram of one cylinder of an engine according to an embodiment of the invention.

FIG. 2 depicts an example embodiment of a combustion chamber, or cylinder 200, of a multi-cylinder internal combustion engine, such as the engine 104 described above with reference to FIG. 1. The engine may be controlled at least partially by a control system including controller 202 which may be in further communication with a vehicle system, such as the vehicle system 100 described above with reference to FIG. 1. In one example, the controller 202 includes a computer control system. The controller 202 may further include computer readable storage media (not shown) including code for enabling on-board monitoring and control of vehicle operation. The controller 202, while overseeing control and management of the vehicle system, may be configured to receive signals from a variety of engine sensors in order to determine operating parameters and operating conditions, and correspondingly adjust various engine actuators to control operation of the vehicle. For example, the controller 202 may receive a signal from a notched throttle (not shown) indicating an operator's desired power output. The controller 202 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 202 may control the vehicle system by sending commands to various components such as traction motors, alternator, cylinder valves, throttle, fuel injectors, etc.

The cylinder (i.e., combustion chamber) 200 of may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake passage 210. The intake passage 210 receives ambient air from an air filter (not shown) that filters air from outside of a vehicle in which the engine is positioned. The intake passage 210 may communicate with other cylinders of the engine in addition to the cylinder 200, for example.

Exhaust gas resulting from combustion in the engine is supplied to an exhaust passage 212. Exhaust gas flows through the exhaust passage 212, to a turbocharger (not shown in FIG. 2) and to atmosphere. The exhaust passage 212 may further receive exhaust gases from other cylinders of the engine in addition to the cylinder 200, for example.

In some embodiments, as will be described in greater detail below with reference to FIG. 3, the vehicle system may include more than one exhaust passage. For example, a donor group of cylinders may be coupled to a first exhaust manifold and a non-donor group of cylinders may be coupled to a second exhaust manifold. In this way, one of the groups of cylinders may be comprised exclusively of donor cylinders which recirculate exhaust gas to the intake passage 210 under selected operating conditions.

Continuing with FIG. 2, each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 202 via an actuator 218. Similarly, the exhaust valve 216 may be controlled by the controller 202 via an actuator 220. During some conditions, the controller 202 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

In some embodiments, the controller 202 may control a frequency and/or duration of fuel injection individually for each fuel injector 226 of the engine. For example, during differential fueling operation, a first fuel injector may be controlled to inject a higher amount of fuel than a second fuel injector, which may be controlled to inject no fuel (in which case it may be referred to as skip fire operation which will be described in greater detail with reference to FIG. 3).

Figure 3:
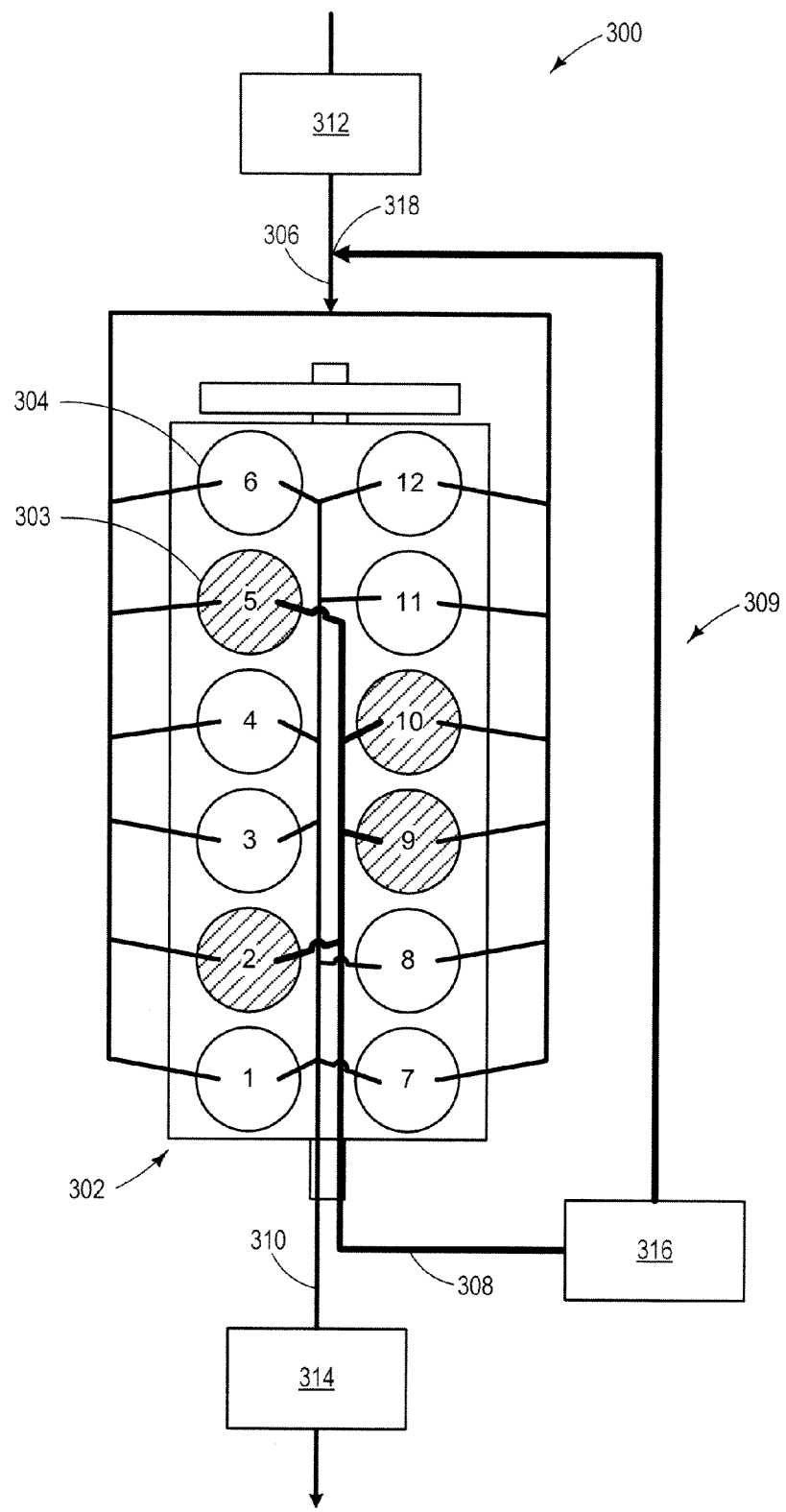
FIG. 3 shows a schematic diagram of an example embodiment of an engine with a plurality of donor cylinders and a plurality of non-donor cylinders according to an embodiment of the invention.

FIG. 3 shows an example embodiment of a system 300 with an engine 302, such as engine 104 described above with reference to FIG. 1, having a plurality of donor cylinders 303 and a plurality of non-donor cylinders 304. In the example embodiment of FIG. 3, the engine 302 is a V-12 engine having twelve cylinders. In other examples, the engine may be a V-6, V-8, V-10, V-16, 1-4, 1-6, 1-8, opposed 4, or another engine type.

In the example embodiment of FIG. 3, the donor cylinders 303 are depicted as a first group of cylinders comprising four cylinders (e.g., cylinders labeled 2, 5, 9, and 10 in FIG. 3). The non-donor cylinders 304 are depicted as a non-donor group of cylinders comprising eight cylinders (e.g., cylinders labeled 1, 3, 4, 6, 7, 8, 11, and 12 in FIG. 3). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 3, the donor cylinders 303 are coupled to a first exhaust manifold 308 which is part of an exhaust gas recirculation (EGR) system 309. The first exhaust manifold 308 is coupled to the exhaust ports of the donor-cylinders. As such, in the present example, the donor cylinders 303 are coupled exclusively to the first exhaust manifold 308.

Exhaust gas from each of the donor cylinders 303 is routed through the EGR system 309 to an exhaust gas inlet 318 in the intake passage 306, and not to atmosphere. Exhaust gas flowing from the donor cylinders to the intake passage 306 passes through an EGR cooler 316 to cool the exhaust gas before the exhaust gas returns to the intake passage. The EGR cooler 316 is in fluid communication with a liquid coolant or other coolant to cool the exhaust gases from the donor cylinders 303. In some embodiments, the liquid coolant may be the same coolant that flows through the cooling sleeve surrounding each cylinder, such as cooling sleeve 228 depicted in FIG. 2, for example.

In the example embodiment illustrated in FIG. 3, the non-donor cylinders 304 are coupled to a second exhaust manifold 310. The second exhaust manifold 310 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 310 via a control element, such as a valve, such that an amount of EGR may be reduced as desired, for example. In the present example, the non-donor cylinders 304 are coupled exclusively to the second exhaust manifold 310. Exhaust gas from the non-donor cylinders 304 flows to an exhaust system 320, and then to atmosphere. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders 304 drives a turbine 314 of a turbocharger.

Some embodiments may include a communication passage between the first exhaust manifold 308 and the second exhaust manifold 310. In some examples, the communication may include a valve (e.g., an EGR valve), and the controller may operate the valve to control communication the donor cylinders and the non-donor cylinders. In such an example, exhaust gas flow from the donor cylinders may be routed to atmosphere instead of to the intake passage or exhaust gas flow from the non-donor cylinders may be routed to the intake passage.

In embodiments in which the engine is a V-engine, the exhaust manifolds 308 and 310 may be inboard exhaust manifolds. For example, the exhaust ports of each of the cylinders are lined up on the inside of the V-shape. In other embodiments, the exhaust manifolds 308 and 310 may be outboard exhaust manifolds. For example, the exhaust ports of each of the cylinders are lined up on the outside of the V-shape.

As depicted in FIG. 3, the engine 302 is configured with a turbocharger including the exhaust turbine 314 arranged along the second exhaust manifold 310, and a compressor 312 arranged in the intake passage 306. The compressor 312 may be at least partially powered by the exhaust turbine 314 via a shaft (not shown). As shown in FIG. 3, the exhaust gas inlet 318 is downstream of the compressor 312 in the intake passage 306.

In a V-12 engine, such as depicted in FIG. 3, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 2, the engine 202 comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire conditions, the donor cylinders may be fired in the same proportion as non-skip fire conditions, for example if half of the cylinders are skipped for the example of FIG. 3, then two of the four donor cylinders may be skipped and 4 of the 8 non-donor cylinders may be skipped thus maintaining the same effective EGR rate. During preferential skip fire conditions, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, two out of ten fired cylinders, or in some embodiments, the non-donor cylinders may be the only cylinders fired. Any proportion of donor cylinders fired is within the scope of this disclosure. The proportion of donor cylinders fired may be selected based upon a desired temperature of exhaust gas from the donor cylinders. For example, when a donor cylinder is skip fired, ambient intake air may be exhausted from the cylinder instead of combustion products and the ambient intake air may have a lower temperature than the combusted gases.

In this manner, the engine may be operated to provide heating or cooling to the EGR cooler such that regeneration may occur while maintaining engine output. In a low temperature mode, as described below with reference to FIGS. 5 and 6, one or more donor cylinders may be skipped such that the temperature of the exhaust flow from the donor cylinders decreases. The lower temperature exhaust flow which passes through the EGR cooler may reduce the temperature of the EGR cooler such that the EGR cooler may be regenerated a low temperature. In a high temperature mode, as described below with reference to FIGS. 7 and 8, one or more non-donor cylinders may be skipped and a fuel injection quantity to the donor cylinders is correspondingly increased such that the temperature of the exhaust flow from the donor cylinders increases. The high temperature exhaust flow which passes through the EGR cooler may increase the temperature of the EGR cooler such that the EGR cooler may be regenerated at a high temperature.

In one embodiment, a method for regenerating an EGR cooler of an EGR system coupled to an engine, the engine including a plurality of donor cylinders and a plurality of non-donor cylinders, such as the EGR system 309 coupled to the engine 302 described above with reference to FIG. 3, includes, during a low temperature mode, decreasing a fuel injection quantity to one or more donor cylinders preferentially and transferring additional fueling to one or more the non-donor cylinders. The method further includes, during a high temperature mode, increasing a fuel injection quantity to the donor cylinders preferentially from the non-donor cylinders. In this way, the donor cylinders combust a greater amount of fuel per cylinder, on average, than the non-donor cylinders thus increasing exhaust temperature of the donor cylinder. Therefore, it is possible to regulate the EGR cooler temperature to a desired temperature, such as a desired regeneration temperature, while still maintaining engine output by appropriate selection of the fueling levels among the cylinder groups.

Figure 4:
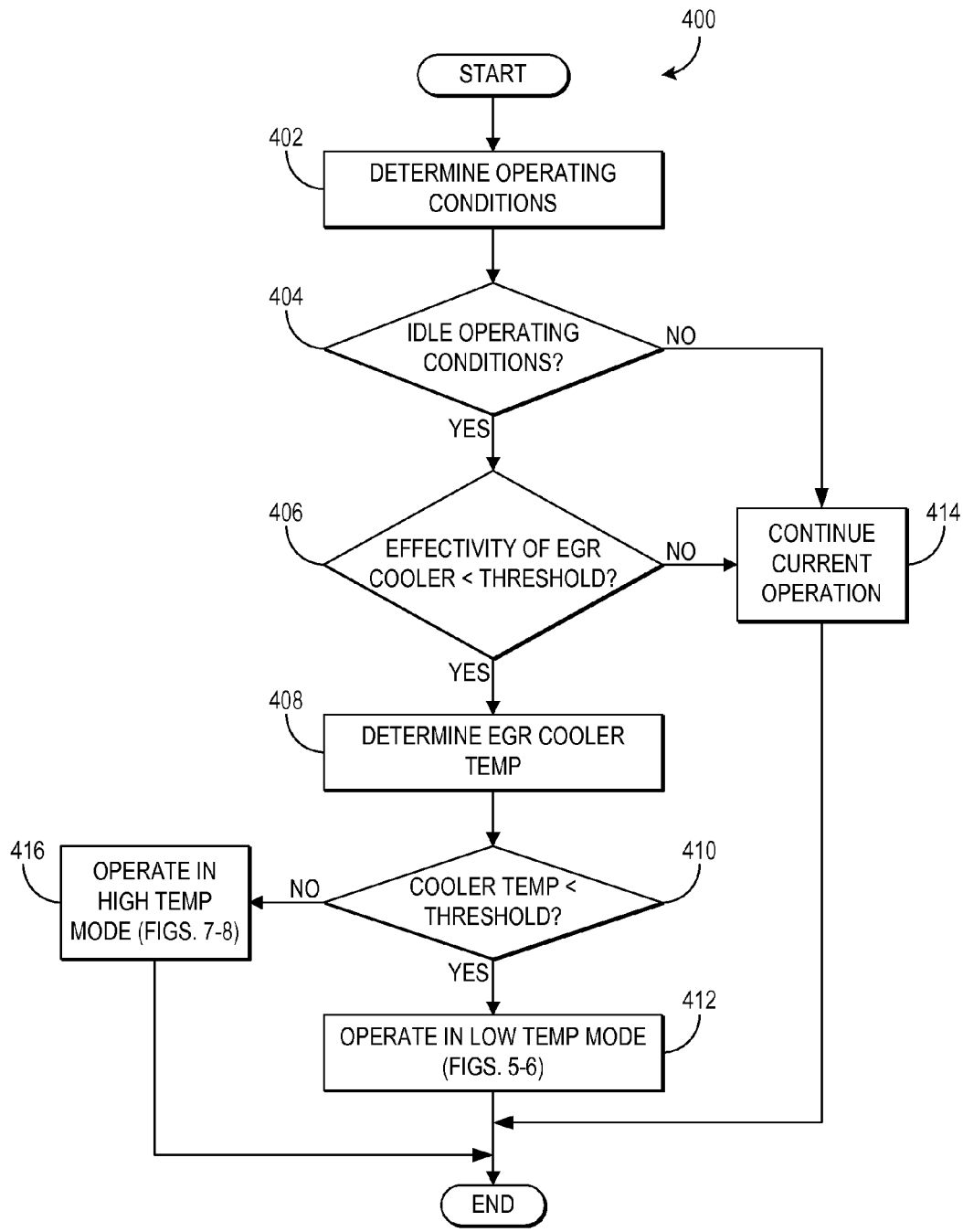
FIG. 4 shows a flow chart illustrating a method for an exhaust gas recirculation system, which includes an exhaust gas recirculation cooler, coupled to an engine.
Figure 5:
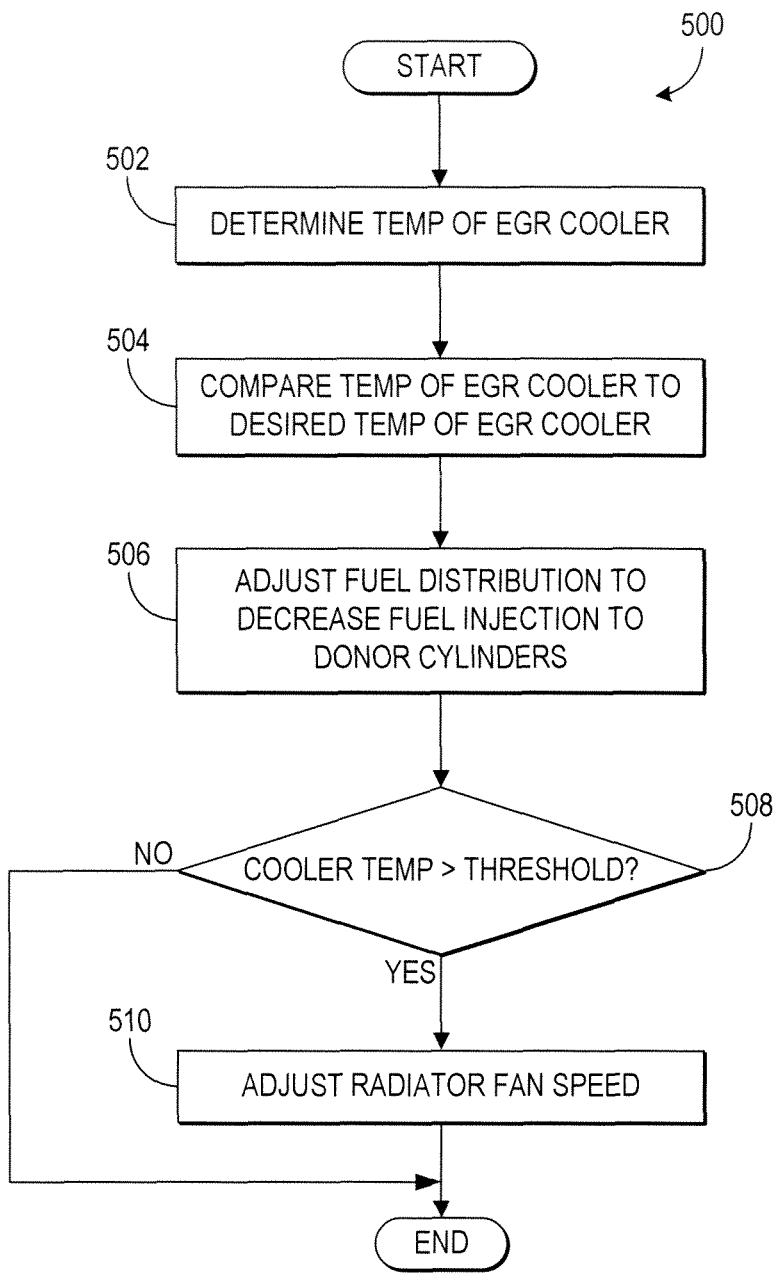
FIG. 5 shows a flow chart illustrating a method for regenerating an exhaust gas recirculation cooler in a low temperature mode.
Figure 6:
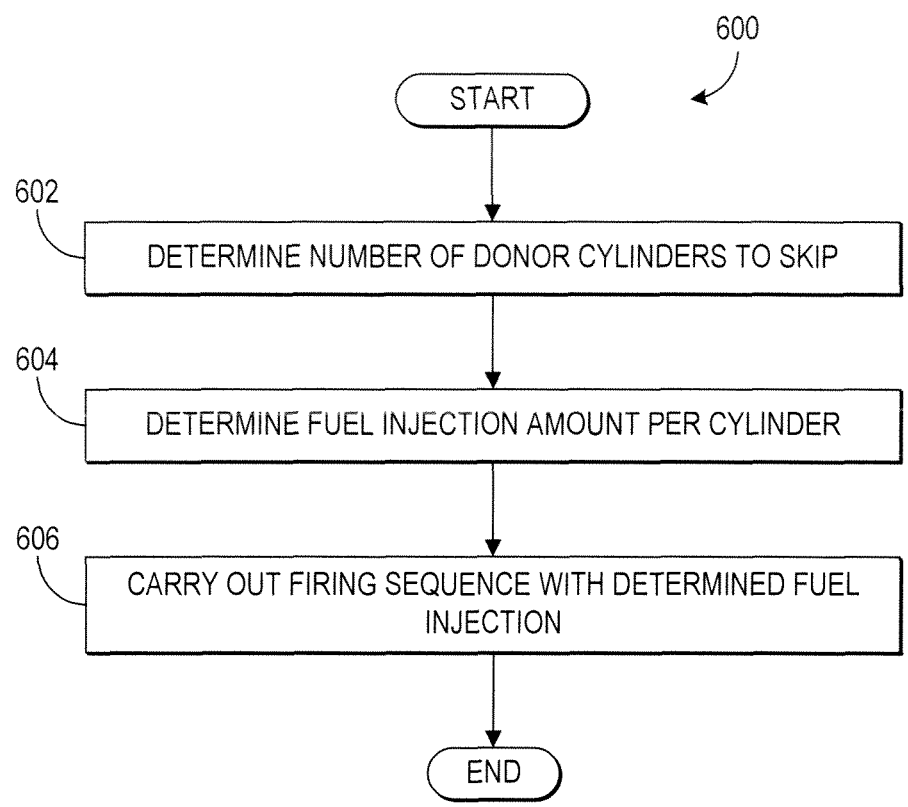
FIG. 6 shows a flow chart illustrating a method for adjusting fuel distribution in a low temperature mode.
Figure 7:
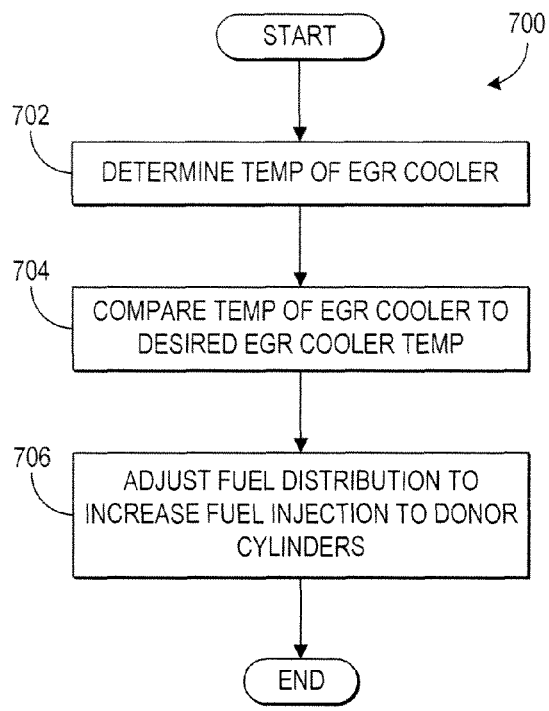
FIG. 7 shows a flow chart illustrating a method for regenerating an exhaust gas recirculation cooler in a high temperature mode.
Figure 8:
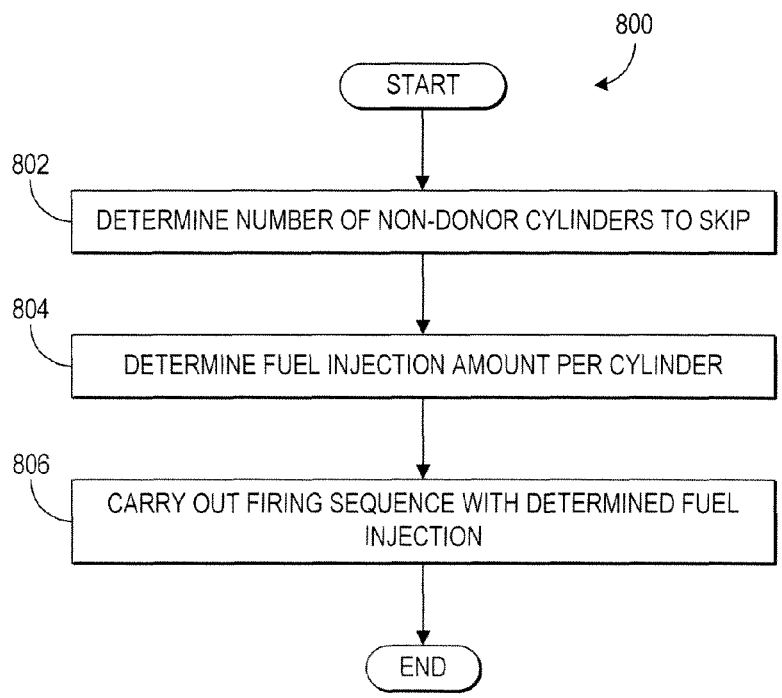
FIG. 8 shows a flow chart illustrating a method for adjusting fuel distribution in a high temperature mode.

Referring now to FIGS. 4-8, methods for an EGR system, which includes an EGR cooler, coupled to an engine are described. FIG. 4 illustrates a method of determining if regeneration of the EGR cooler is desired based on an effectivity of the EGR cooler. The method shown in FIG. 4 further determines if the regeneration should be carried out in a low temperature regeneration mode or in a high temperature regeneration mode. FIGS. 5 and 6 illustrate the low temperature mode of operation and adjustment of fuel distribution across the cylinders, respectively. FIGS. 7 and 8 illustrate the high temperature mode of operation and adjustment of fuel distribution across the cylinders, respectively.

FIG. 4 shows a flow chart illustrating a method 400 for an EGR system including an EGR cooler coupled to an engine, such as the EGR system 309 coupled to the engine 302 described above with reference to FIG. 3. Specifically, the method determines if regeneration of the EGR cooler is requested based on an effectivity of the EGR cooler.

At 402, operating conditions are determined. The operating conditions may include engine load, ambient temperature, exhaust gas temperature, engine coolant temperature, and the like.

At 404, it is determined if the engine is under idle operating conditions. In some examples, a portion of a rail vehicle duty cycle may be idle time (e.g., at least 50%). During idle conditions, an EGR rate may be low as compared to loaded engine conditions. As such, the EGR cooler may be regenerated during idle conditions, as a low temperature mode of regeneration may substantially reduce the EGR rate, as will be described below.

If it is determined that the engine is not under idle operating conditions, the method moves to 414 and current operation is continued. If it is determined that the engine is under idle operating conditions, it is determined if the effectivity of the EGR cooler is greater than a threshold at 406. For example, the effectivity of the EGR cooler is a ratio of heat transfer which may be calculated using temperature values of three of the following: exhaust gas in, exhaust gas out, coolant in, and coolant out. An EGR cooler that is fouled due to build-up of particulates from the exhaust gas may have a low effectivity, for example, as exhaust gas may be not effectively cooled. If it is determined that the effectivity is greater than a threshold value, current operation is continued at 414 and the method ends.

On the other hand, if it is determined that the effectivity is less than the threshold value, and regeneration of the EGR cooler is desired, the method continues to 408 where a core temperature of the EGR cooler (e.g., the temperature of the EGR cooler) is determined. At 410, it is determined if the temperature of the EGR cooler is less than a threshold temperature. As an example, the threshold temperature may be a median temperature, above which the temperature of the EGR cooler may be more easily increased, and below which the EGR cooler temperature may be more easily decreased. Thus, if the temperature of the EGR cooler exceeds the threshold temperature, the system is operated in a high temperature mode at 416, as will be described in greater detail below with reference to FIGS. 7 and 8. On the other hand, if the temperature of the EGR cooler is less than the threshold temperature, the system is operated in a low temperature mode, as will be described in greater detail below with reference to FIGS. 5 and 6.

FIG. 5 shows a flow chart illustrating a method for regenerating an EGR cooler in a low temperature mode. Specifically, the method determines a temperature of the EGR cooler and adjusts fuel distribution among the donor cylinders and non-donor cylinders based on a desired temperature of the EGR cooler.

At 502, the temperature of the EGR cooler is determined. As described above, the temperature of the EGR cooler may be a core temperature of the EGR cooler. At 504, the temperature of the EGR cooler is compared to a desired temperature of the EGR cooler to determine a difference between the current temperature of the EGR cooler and the desired temperature of the EGR cooler. During the low temperature mode, the desired temperature of the EGR cooler may be a relatively low temperature (e.g., a temperature lower than in a high temperature regeneration mode). In one example, the desired temperature may be less than 50° C., and more specifically, in a range of 40-50° C. At the low temperature, particulate matter that has built up in the EGR cooler such as soot may hydrolyze such that it can break off due to the force of the airflow through the EGR cooler. In some examples, the low temperature may result in formation of condensate, which may regenerate the EGR cooler by washing the particulate build-up from the EGR cooler.

At 506, fuel distribution is adjusted to decrease a fuel injection quantity from the donor cylinders preferentially from the non-donor cylinders based on the actual and desired EGR cooler temperatures according to the method 600 illustrated in FIG. 6. At 602, a number of donor cylinders to skip is determined. The number of donor cylinders to skip may be determined based on the desired temperature of exhaust gas from the donor cylinders. For example, if the difference between the desired EGR cooler temperature and the EGR cooler temperature determined at 504 is relatively large, one or more donor cylinders may be skipped in order to decrease the temperature of the donor cylinder exhaust gas, thereby decreasing the temperature of the EGR cooler. On the other hand, if the difference between the desired temperature of the EGR cooler and the current temperature is relatively small, it may be determined that no donor cylinders should be skip fired (e.g., all cylinder firing with differential fueling between the donor and non-donor cylinders).

At 604, a fuel injection amount, or quantity, per cylinder is determined. The fuel injection amount per cylinder may be based on fuel demand, desired temperature of the donor cylinder exhaust gas, and the number of donor cylinders that are skipped (as determined at 602). The fuel injection amount to the donor cylinders may be based on the desired temperature of the donor cylinder exhaust gas. As an example, a fuel injection quantity to one or more of the donor cylinders may be decreased in order to reduce the donor cylinder exhaust gas temperature such that the temperature of the EGR cooler may be reduced. The fuel injection quantity to the non-donor cylinders may be increased in proportion to the reduced fuel distribution to the donor cylinders. For example, if the fuel injection quantity is decreased by 20% in each of the donor cylinders (e.g., four donor cylinders in the example depicted in FIG. 3), the fuel injection quantity may be increased by 80% across the non-donor cylinders (e.g., each non-donor cylinder receives a 10% fuel increase, four non-donor cylinders receive a 20% fuel increase, etc.). In some examples, a fuel injection quantity to the non-donor cylinders may be increased such there is an even fuel distribution across the non-donor cylinders. In other examples, a fuel injection quantity to the non-donor cylinders may be increased such that there is an uneven fuel distribution across the non-donor cylinders. The amount of fuel injected to each cylinder may be based on air fuel ratio constraints, for example. The cylinders may have minimum and maximum air fuel ratio constraints based on the engine operating conditions. A fuel injection amount which results in an air fuel ratio that is too high or low may result in engine misfire, increased emissions, torque imbalance, and the like, and thus the selection of the fuel increase and decrease for each respective cylinder may be constrained in this way.

As another example, fuel injection to one or more of the donor cylinders may be stopped while a fuel injection quantity to remaining donor cylinders may be decreased in order to reduce the donor cylinder exhaust gas temperature such that the temperature of the EGR cooler may be reduced. The fuel injection quantity to the non-donor cylinders may be increased in proportion to the reduced fuel distribution to the donor cylinders (taking into account the complete reduction in injected fuel to skipped donor cylinders). For example, if the fuel injection quantity is decreased by 20% in each of two donor cylinders and two donor cylinders are skip fired (e.g., four donor cylinders in the example depicted in FIG. 3), the fuel injection quantity may be increased by 40% across the non-donor cylinders (e.g., each non-donor cylinder receives a 5% fuel increase, four non-donor cylinders receive a 10% fuel increase, etc.). As noted above, in some examples, the fuel injection quantity to the non-donor cylinders may be increased such there is an even fuel distribution across the non-donor cylinders, or the fuel injection quantity to the non-donor cylinders may be increased such that there is an uneven fuel distribution across the non-donor cylinders.

At 606, a firing sequence is carried out with the determined fuel injection the quantity to each of the cylinders. In one example, fuel injection to a subset of the donor cylinder may be cut-off and the fuel injection quantity to the other donor cylinders is reduced, while the fuel injection quantity to one or more of the non-donor cylinders is increased such that a torque generated by the engine is maintained. In another example, the fuel injection quantity may be reduced by a same or different amount in each of the donor cylinders, and the fuel injection quantity to one or more of the non-donor cylinders is increased. In yet another example, fuel injection may be cut-off to every donor cylinder, while the fuel injection quantity to a subset or each of the non-donor cylinders is increased. In such an example, the exhaust gas routed though the EGR cooler to the intake passage may be comprised of only cooled intake air, as fuel is not injected to the donor cylinder and combustion does not occur in the donor cylinders.

In some embodiments, the fuel injection quantity to each cylinder may vary between engine cycles such that cylinder firing is balanced across engine cycles. As a non-limiting example, if non-donor cylinders 1, 8, 4, and 11 receive a 10% increase of the fuel injection quantity and non-donor cylinders 7, 3, 6, and 12 receive a 0% increase of the fuel injection quantity during a first engine cycle such that the fuel injection quantity is reduced by 40% across the donor cylinders, non-donor cylinders 7, 3, 6, and 12 may receive a 10% increase of the fuel injection quantity while non-donor cylinders 1, 8, 4, and 11 receive a 0% increase of the fuel injection quantity during the subsequent engine cycle, while the donor cylinders still have the fuel injection quantity that is reduced by 40%.

Continuing with method 500 shown in FIG. 5, at 508, it is determined if the EGR cooler temperature is greater than a threshold temperature. The threshold temperature may be the desired temperature, for example, or a temperature that is within a range of the desired temperature. If the EGR cooler temperature is less than the desired temperature, the method ends. If the EGR cooler temperature is greater than the desired temperature, regeneration may not occur as desired, and the method continues to 510 where a speed of one or more radiator fans is adjusted. By adjusting the radiator fan speed, a temperature of the engine coolant may be further reduced as it passes through the radiator. For example, if the temperature is still too high even if all donor cylinders are skip fired, the temperature of the coolant passing through the EGR cooler may be lower resulting in increased cooling of the EGR cooler and thus a lower temperature may be obtained to regenerate the cooler. Further, in some examples, coolant flow rate of coolant supplied to the EGR cooler may be increased in order to increase cooling of the EGR cooler.

In some example, the engine speed may be increased such that a velocity of the exhaust gas passing through the EGR cooler is increased to aid in cooler regeneration. As such, when a temperature of the exhaust gas is low (e.g., when the fuel injection quantity is reduced and/or cut-off in the donor cylinders), the EGR cooler may be cooled such that regeneration may be initiated more rapidly. Increasing the engine speed may be desirable, for example, when switching from the high temperature mode to the low temperature mode of operation.

Thus, during the low temperature mode of regenerating the EGR cooler, the fuel injection quantity may be adjusted such that fuel to one or more donor cylinders is reduced and/or skipping of one or more of the donor cylinders occurs during an engine cycle. In this manner, a temperature of the exhaust gas exiting the donor cylinders may be decreased such that a temperature of the EGR cooler may be decreased in order to facilitate regeneration of the EGR cooler at low temperature.

FIG. 7 shows a flow chart illustrating a method for regenerating an EGR cooler in a high temperature mode. Specifically, the method determines a temperature of the EGR cooler and adjusts fuel distribution among the donor cylinders and non-donor cylinders based on a desired temperature of the EGR cooler.

At 702 of method 700, the temperature of the EGR cooler is determined. As described above, the temperature of the EGR cooler may be a core temperature of the EGR cooler. At 704, the temperature of the EGR cooler is compared to a desired temperature of the EGR cooler. During the high temperature mode, the desired temperature of the EGR cooler may be a relatively high temperature (e.g., a temperature higher than in a low temperature regeneration mode). In one example, the desired temperature of the EGR cooler may be in a range of 500-750° C. In other examples, the desired temperature may be less than 500° C. or greater than 750° C. At the high temperature, particulate matter that has built up in the EGR cooler may be removed by the high temperature exhaust gas, high velocity flow through the EGR cooler, thereby regenerating the EGR cooler.

At 706 of method 700, fuel distribution is adjusted responsive to the EGR cooler temperature to increase the fuel injection quantity to the donor cylinders preferentially from the non-donor cylinders according to the method 800 illustrated in FIG. 8. At 802, a number of non-donor cylinders to skip is determined. The number of donor cylinders to skip may be determined on the desired temperature of exhaust gas from the donor cylinders. For example, if the difference between the desired EGR cooler temperature and the EGR cooler temperature determined at 704 is relatively large, one or more non-donor cylinders may be skipped such that the fuel injection quantity may be increased in the donor cylinders in order to increase the temperature of the donor cylinder exhaust gas, thereby increasing the temperature of the EGR cooler. On the other hand, if the difference between the desired temperature of the EGR cooler and the current temperature is relatively small, it may be determined that no non-donor cylinders should be skip fired.

At 804, a fuel injection amount per cylinder is determined. The fuel injection amount per cylinder may be based on fuel demand, desired temperature of the donor cylinder exhaust gas, and the number of donor cylinders that are skipped (as determined at 802). The fuel injection amount to the donor cylinders may be based on the desired temperature of the donor cylinder exhaust gas. As an example, the fuel injection quantity to one or more of the donor cylinders may be increased in order to increase the donor cylinder exhaust gas temperature such that the temperature of the EGR cooler may be increased. The fuel injection quantity to the non-donor cylinders may be decreased in proportion to the induced fuel distribution to the donor cylinders. For example, if the fuel injection quantity is increased by 15% in each of the donor cylinders (e.g., four donor cylinders in the example depicted in FIG. 3), the fuel injection quantity may be reduced by 60% across the non-donor cylinders (e.g., each non-donor cylinder receives a 7.5% fuel reduction, four non-donor cylinders receive a 15% fuel increase, etc.). In some examples, the fuel injection quantity to the non-donor cylinders may be decreased such there is an even fuel distribution across the non-donor cylinders. In other examples, the fuel injection quantity to the non-donor cylinders may be increased such that there is an uneven fuel distribution across the non-donor cylinders. The amount of fuel injected to each cylinder may be based on air fuel ratio constraints, for example. As described above, the cylinders may have minimum and maximum air fuel ratio constraints based on the engine operating conditions. A fuel injection amount which results in an air fuel ratio that is too high or low may result in engine misfire, increased emissions, torque imbalance, and the like.

At 806, a firing sequence is carried out with the determined fuel injection quantity to each of the cylinders. In one example, the fuel injection quantity may be shifted from the non-donor cylinders to the donor cylinders such that the fuel injection quantity in every donor cylinder is increased, and fuel injection to at least one of the non-donor cylinders is cut-off. In other examples, the fuel injection quantity may be increased to a subset of the donor cylinders, while the fuel injection quantity is decreased to a subset of the non-donor cylinders. In yet another example, the fuel injection quantity may be increased to every donor cylinder, while fuel injection is cut-off to every non-donor cylinder.

As described above, in some embodiments, the fuel injection quantity to each cylinder may vary between engine cycles such that cylinder firing is balanced across engine cycles. As a non-limiting example, if non-donor cylinders 1, 7, 8, and 3 receive a 15% decrease of the fuel injection quantity and non-donor cylinders 4, 6, 11, and 12 receive a 5% decrease of the fuel injection quantity during a first engine cycle such that the fuel injection quantity to the donor cylinders is increased by 80%, non-donor cylinders 4, 6, 11, and 12 may receive a 5% decrease of the fuel injection quantity while non-donor cylinders 1, 7, 8, and 3 receive a 15% increase of the fuel injection quantity during the subsequent engine cycle, while the donor cylinders still receive a fuel injection quantity increase of 80%.

Thus, during the high temperature mode of regenerating the EGR cooler, the fuel injection quantity may be adjusted such that skipping of one or more of the non-donor cylinders occurs during an engine cycle. In this manner, a temperature of the exhaust gas exiting the donor cylinders may be increased such that a temperature of the EGR cooler may be increased in order to facilitate regeneration of the EGR cooler at high temperature.

In some embodiments, the system may switch between high temperature and low temperature modes of regenerating the EGR cooler. For example, the system might switch between high temperature and low temperature mode in order make sure the particulate build-up is cleaned from the EGR cooler, as each mode cleans the EGR cooler is a different way. As an example, the low temperature mode may be carried out for a predetermined amount of time (e.g., 2-5 hours), and then the high temperature mode may carried out. The high temperature may be an emissions performance mode, as exhaust gas is recirculated during the high temperature mode (and may not be recirculated during the low temperature mode) and $NO_x$ emission, for example, may be reduced. As such, the system may switch from the low temperature mode to the high temperature mode if $NO_x$ emission exceeds a threshold value. In another example, the system may switch between high temperature and low temperature modes based on a temperature of the engine coolant. For example, if the coolant temperature increases above a threshold temperature, the system may switch from the low temperature mode to the high temperature mode.

In some embodiments, the injection schedule among the donor cylinder group and the non-donor cylinder group may additionally or alternatively be adjusted responsive to the temperature of the exhaust gas recirculation cooler. The injection schedule may include injection timing, pressure, number of injections per cycle, and the like. In one example, during the high temperature mode, one or more donor cylinders may receive an additional post injection (e.g., a first injection for combustion near top dead center at the end of compression or beginning of expansion, and an additional injection of fuel late in the expansion or exhaust stroke to provide exhaust heat) in order to increase a temperature of the donor cylinder exhaust gas. In another example, during the high temperature mode, fuel rail pressure may be increased and injection timing may be advanced in one or more donor cylinders. In contrast, during the low temperature mode, fuel injection may be retarded in one or more donor cylinders such that donor cylinder exhaust temperature is decreased.

An embodiment relates to a control module. The control module may be a hardware and/or software module, meaning the module includes one or more of the following: electronic components configured to operate to perform the indicated function(s); or control instructions (e.g., stored on non-transitory tangible medium) that when executed by a controller- or processor-based device cause the controller- or processor-based device to perform the indicated function(s). The control module is configured to be operably coupled with, and/or to control a controller- or processor-based device operably coupled with, an engine system having a donor cylinder group, a non-donor cylinder group, and an exhaust gas recirculation cooler; the exhaust gas recirculation cooler is operably coupled between the donor cylinder group and an air intake of the engine system. The control module is configured to control the engine system for adjusting fuel distribution among the donor cylinder group and the non-donor cylinder group responsive to a temperature of the exhaust gas recirculation cooler. In another embodiment, the control module is configured to identify an effectivity of the exhaust gas recirculation cooler, and, based on the effectivity of the exhaust gas recirculation cooler, to initiate regeneration of the exhaust gas recirculation cooler by controlling the engine system for adjusting fuel distribution among the donor cylinder group and the non-donor cylinder group. In another embodiment, the control module is additionally configured to control operation of the engine system in a high temperature mode and a low temperature mode as described above.

As explained above, the terms "high temperature" and "low temperature" are relative, meaning that "high" temperature is a temperature higher than a "low" temperature. Conversely, a "low" temperature is a temperature lower than a "high" temperature.

As used herein, an element or step recited in the singular and proceeded with the word "a" or "an" should be understood as not excluding plural of said elements or steps, unless such exclusion is explicitly stated, Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for regenerating an exhaust gas recirculation cooler, comprising:
   routing exhaust gas from a donor cylinder group of an engine to an intake passage of the engine through the exhaust gas recirculation cooler;
   routing exhaust gas from a non-donor cylinder group of the engine to an exhaust passage of the engine; and
   adjusting fuel distribution among the donor cylinder group and the non-donor cylinder group to regenerate the exhaust gas recirculation cooler at each of a low temperature and a high temperature, the low temperature lower than the high temperature, responsive to a temperature of the exhaust gas recirculation cooler.

2. A method for regenerating an exhaust recirculation cooler, comprising:
   routing exhaust gas from a donor cylinder group of an engine to an intake passage of the engine through the exhaust gas recirculation cooler;
   routing exhaust gas from a non-donor cylinder group of the engine to an exhaust passage of the engine; and
   adjusting fuel distribution among the donor cylinder group and the non-donor cylinder group responsive to a temperature of the exhaust gas recirculation cooler, where adjusting the fuel distribution includes, during a low temperature regeneration mode, shifting a fuel injection quantity from the donor cylinder group to the non-donor cylinder group to decrease the temperature of the exhaust gas recirculation cooler.

3. The method of claim 2, wherein the low temperature regeneration mode is carried out when the temperature of the exhaust gas recirculation cooler is less than a threshold temperature.

4. The method of claim 2, further comprising, during the low temperature regeneration mode, cutting fuel injection to every cylinder of the donor cylinder group and increasing a fuel injection quantity to the non-donor cylinder group.

5. The method of claim 2, further comprising, during the low temperature regeneration mode, decreasing temperature or increasing a flow rate of coolant supplied to the exhaust gas recirculation cooler when the temperature of the exhaust gas recirculation cooler is greater than a threshold temperature.

6. A method for regenerating an exhaust recirculation cooler, comprising:
   routing exhaust gas from a donor cylinder group of an engine to an intake passage of the engine through the exhaust gas recirculation cooler;
   routing exhaust gas from a non-donor cylinder group of the engine to an exhaust passage of the engine; and
   adjusting fuel distribution among the donor cylinder group and the non-donor cylinder group responsive to a temperature of the exhaust gas recirculation cooler, where adjusting the fuel distribution includes, during a high temperature regeneration mode, shifting a fuel injection quantity from the non-donor cylinder group to the donor cylinder group to increase the temperature of the exhaust gas recirculation cooler while maintaining engine power output.

7. The method of claim 6, further comprising performing multiple fuel injections per combustion cycle of at least one donor cylinder, the multiple fuel injections including a post fuel injection to increase exhaust temperature.

8. The method of claim 6, wherein the high temperature regeneration mode is carried out when the temperature of the exhaust gas recirculation cooler is greater than a threshold temperature.

9. The method of claim 1, wherein the exhaust gas routed from the donor cylinder group is not routed to atmosphere, and the exhaust gas routed from the non-donor cylinder group is routed to atmosphere.

10. The method of claim 1, further comprising adjusting an injection schedule among the donor cylinder group and the non-donor cylinder group responsive to the temperature of the exhaust gas recirculation cooler.

11. The method of claim 1, further comprising adjusting the fuel distribution during idle engine conditions.

12. A method for regenerating an exhaust gas recirculation cooler of an exhaust gas recirculation system coupled to an engine, comprising:
   during a low temperature regeneration mode, decreasing a fuel injection quantity to one or more donor cylinders of an engine preferentially and transferring additional fueling to one or more non-donor cylinders of the engine; and
   during a high temperature regeneration mode, increasing the fuel injection quantity to the donor cylinders preferentially from the non-donor cylinders.

13. The method of claim 12, wherein the low temperature regeneration mode is initiated when a temperature of the exhaust gas recirculation cooler is less than a threshold temperature.

14. The method of claim 12, wherein the high temperature regeneration mode is initiated when a temperature of the exhaust gas recirculation cooler is greater than a threshold temperature.

15. The method of claim 12, wherein, during the low temperature regeneration mode, decreasing the fuel injection quantity to the donor cylinders includes cutting fuel injection to one or more of the donor cylinders.

16. The method of claim 12, further comprising, during the high temperature regeneration mode, cutting fuel injection to at least one of the non-donor cylinders.

17. The method of claim 12, further comprising, during the low temperature regeneration mode, decreasing coolant temperature or increasing coolant flow rate to the exhaust gas recirculation cooler when a temperature of the exhaust gas recirculation cooler is greater than a threshold temperature.

18. The method of claim 12, further comprising, switching from the low temperature regeneration mode to the high temperature regeneration mode when nitrogen oxide emissions exceed a threshold value.

19. A system, comprising:
an engine having a donor cylinder group including one or more donor cylinders and a non-donor cylinder group including a plurality of non-donor cylinders;
an exhaust gas recirculation system including a first exhaust manifold coupled between the donor cylinder group and an engine intake passage, and an exhaust gas recirculation cooler;
a second exhaust manifold coupled to the non-donor cylinder group; and
a controller configured to identify an effectivity of the exhaust gas recirculation cooler, and, based on the effectivity of the exhaust gas recirculation cooler, regenerate the exhaust gas recirculation cooler at each of a low temperature and a high temperature, the low temperature lower than the high temperature, by adjusting fuel distribution among the donor cylinder group and the non-donor cylinder group, where whether to regenerate the exhaust gas recirculation cooler at the low temperature or the high temperature is based on a temperature of the exhaust gas recirculation cooler relative to a threshold temperature.

20. A system, comprising:
an engine having a donor cylinder group including one or more donor cylinders and a non-donor cylinder group including a plurality of non-donor cylinders;
an exhaust gas recirculation system including a first exhaust manifold coupled between the donor cylinder group and an engine intake passage, and an exhaust gas recirculation cooler;
a second exhaust manifold coupled to the non-donor cylinder group; and
a controller configured to identify an effectivity of the exhaust gas recirculation cooler, and, based on the effectivity of the exhaust gas recirculation cooler, regenerate the exhaust gas recirculation cooler by adjusting fuel distribution among the donor cylinder group and the non-donor cylinder group and where the controller is further configured to adjust the fuel distribution responsive to a temperature of the exhaust gas recirculation cooler to decrease a fuel injection quantity to one or more donor cylinders of the donor cylinder group preferentially from the non-donor cylinder group to operate in a low temperature regeneration mode where a temperature of the exhaust gas recirculation cooler is less than a threshold temperature.

21. A system, comprising:
an engine having a donor cylinder group including one or more donor cylinders and a non-donor cylinder group including a plurality of non-donor cylinders;
an exhaust gas recirculation system including a first exhaust manifold coupled between the donor cylinder group and an engine intake passage, and an exhaust gas recirculation cooler;
a second exhaust manifold coupled to the non-donor cylinder group; and
a controller configured to identify an effectivity of the exhaust gas recirculation cooler, and, based on the effectivity of the exhaust gas recirculation cooler, regenerate the exhaust gas recirculation cooler by adjusting fuel distribution among the donor cylinder group and the non-donor cylinder group and where the controller is further configured to adjust the fuel distribution responsive to a temperature of the exhaust gas recirculation cooler to increase a fuel injection quantity to one or more donor cylinders of the donor cylinder group preferentially from the non-donor cylinder group to operate in a high temperature regeneration mode where a temperature of the exhaust gas recirculation cooler is greater than a threshold temperature.

* * * * *

UNITED STATES PATENT AND TRADEMARK OFFICE
CERTIFICATE OF CORRECTION

PATENT NO. : 8,903,631 B2  Page 1 of 1
APPLICATION NO. : 13/163391
DATED : December 2, 2014
INVENTOR(S) : Klingbeil et al.

It is certified that error appears in the above-identified patent and that said Letters Patent is hereby corrected as shown below:

In the Specification

In Column 15, Line 7, delete "stated," and insert -- stated. --, therefor.

Signed and Sealed this
Ninth Day of June, 2015

Michelle K. Lee
*Director of the United States Patent and Trademark Office*